United States Patent [19]

Schlosberg et al.

[11] Patent Number: 5,470,497
[45] Date of Patent: Nov. 28, 1995

[54] REFRIGERATION WORKING FLUID COMPOSITIONS CONTAINING TRIFLUOROETHANE AND NEOPENTYL GLYCOL OR TRIMETHYLOLPROPANE ESTERS OF $C_7$ AND $C_9$ ACIDS

[75] Inventors: Richard H. Schlosberg; Carolyn B. Duncan; Martin A. Krevalis, Jr., all of Baton Rouge, La.

[73] Assignee: Exxon Chemical Patents Inc., Wilmington, Del.

[21] Appl. No.: 365,187

[22] Filed: Dec. 28, 1994

Related U.S. Application Data

[63] Continuation of Ser. No. 992,412, Dec. 17, 1992, abandoned.

[51] Int. Cl.$^6$ .......................... C09K 5/04; C10M 105/38
[52] U.S. Cl. .................... 252/68; 252/56 S; 252/56 R; 252/67
[58] Field of Search .................... 252/68, 67, 56 R, 252/56 S

[56] References Cited

U.S. PATENT DOCUMENTS

| | | | |
|---|---|---|---|
| 4,755,316 | 7/1988 | Magid et al. | 252/68 |
| 4,851,144 | 7/1989 | McGraw et al. | 252/52 A |
| 5,021,179 | 6/1991 | Zehler et al. | 252/54.6 |
| 5,096,606 | 3/1992 | Hagihara et al. | 252/68 |
| 5,202,044 | 4/1993 | Hagihara et al. | 252/68 |

FOREIGN PATENT DOCUMENTS

| | | |
|---|---|---|
| 0406479 | 1/1991 | European Pat. Off. . |
| 0415778 | 3/1991 | European Pat. Off. . |
| 0430657 | 6/1991 | European Pat. Off. . |
| 0435253 | 7/1991 | European Pat. Off. . |
| 0440069 | 8/1991 | European Pat. Off. . |
| 0449406 | 10/1991 | European Pat. Off. . |
| 0475751 | 3/1992 | European Pat. Off. . |
| 0480479 | 4/1992 | European Pat. Off. . |
| 0479338 | 4/1992 | European Pat. Off. . |
| 0498152 | 8/1992 | European Pat. Off. . |
| 2216541 | 10/1989 | United Kingdom . |
| 90/12849 | 11/1990 | WIPO . |

*Primary Examiner*—Christine Skane
*Attorney, Agent, or Firm*—Richard D. Jordan

[57] ABSTRACT

There are disclosed refrigeration working fluid compositions comprising 1,1,1-trifluoroethane refrigerant and either a neopentylglycol ester of 3,5,5-trimethylhexanoic acid or a trimethylolpropane ester of a mixture of 65 wt. % 3,5,5-trimethylhexanoic acid, 22.2 wt. % n-heptanoic acid and 12.8 wt. % methylhexanoic acid. The esters exhibit suitable viscosity ranges and miscibility with the refrigerant over a broad compositional range.

4 Claims, No Drawings

5,470,497

REFRIGERATION WORKING FLUID COMPOSITIONS CONTAINING TRIFLUOROETHANE AND NEOPENTYL GLYCOL OR TRIMETHYLOLPROPANE ESTERS OF C₇ AND C₉ ACIDS

This is a continuation of application Ser. No. 992,412, filed Dec. 17, 1992 now abandoned.

This application is related to application Ser. No. 804,314, filed Dec. 6, 1991.

BACKGROUND OF THE INVENTION

1. Field of the Invention

The invention relates to refrigeration working fluid compositions. More particularly this invention relates to refrigeration working fluid compositions comprising mixtures of 1,1,1-trifluoroethane ($CH_3CF_3$) as the sole refrigerant and certain polyol ester lubricants having suitable viscosities and which are miscible with the refrigerant at low temperatures.

2. Description of Related Art

Cooling systems of the mechanical vapor recompression type, including refrigerators, freezers, heat pumps, air conditioning systems, and the like, are well known. In such devices, a refrigerant of suitable boiling point evaporates at low pressure, taking heat from the surrounding zone. The resulting vapor is then compressed and passed to a condenser where it condenses and gives off heat to a second zone. The condensate is then returned through an expansion valve to the evaporator, so completing the cycle.

It is recognized that currently used refrigerants which contain chlorine, such as dichlorodifluoromethane, will be replaced by chlorine-free refrigerant fluids because of the adverse effect of the chlorinated materials upon the atmospheric ozone layer. Tetrafluoroethane isomers and in particular "Refrigerant 134a", which is 1,1,1,2-tetrafluoroethane, are now considered desirable fluids for use in refrigeration systems. Another such refrigerant is 1,1,1-trifluoroethane.

Refrigeration working fluids are required to have a lubricant which is compatible and miscible with the refrigerant so that moving parts of the system are properly lubricated. Heretofore, such lubricants have been composed of hydrocarbon mineral oils which are miscible with the chlorine-containing refrigerant fluids and which provide effective lubrication.

The use of such chlorine-free refrigerants has created a need for new lubricants, since mineral oils are not compatible with these materials. This need is well recognized in the art and there are numerous recent publications and patents disclosing various types of synthetic lubricants which are said to be compatible with such refrigerant fluids. Esters of polyols are being particularly emphasized as being suitable for use with the chlorine-free refrigerants, especially Refrigerant 134a.

U.S. Pat. No. 5,021,179, issued Jun. 4, 1991 to Zehler et al., discloses esters of polyols in which the acyl groups have at least 22% of (a) branched acyl groups or (b) acyl groups which contain no more than six carbon atoms. This patent also indicates that the esters have a certain ratio of the number percent of acyl groups that have 8 or more carbon atoms and are unbranched to the number percent of acyl groups that are branched and contain not more than 6 carbon atoms, and that this ratio is not greater than 1.56. Also, the patent requires that the number percent of acyl groups having at least 9 carbon atoms, branched or not branched, will be not greater than 81.

PCT Application WO 90/12849 published Nov. 1, 1990 by Jolley et al. discloses generally liquid compositions containing a major amount of at least one fluorine containing hydrocarbon containing one or two carbon atoms and a minor amount of at least one soluble organic lubricant comprising at least one carboxylic ester of a polyhydroxy compound containing at least two hydroxy groups and having the formula $R[OC(O)R']_n$ where R is hydrocarbyl, each R' is independently hydrogen, straight chain lower hydrocarbyl, a branched chain hydrocarbyl group, or a straight chain hydrocarbyl group containing from 8 to about 22 carbon atoms, provided that at least one R' group is hydrogen, a lower straight chain hydrocarbyl or a branched chain hydrocarbyl group, or a carboxylic acid-containing or carboxylic acid ester-containing hydrocarbyl group, and n is at least 2.

U.K. Patent 2,216,541, issued Oct. 23, 1991, to Imperial Chemical Industries and published Oct. 11, 1989, discloses the use of any ester of molecular weight 250 or greater as being suitable for use as compatible lubricants with Refrigerant 134a (R134a) and some related refrigerant fluids. The patent exemplifies adipates, pyromellitates and benzoates.

European Published Patent Application 440069 published Aug. 7, 1991 by Kao Corporation discloses refrigeration working fluids composed of fluoroethanes and esters prepared by reacting an aliphatic polyol and a straight or branched chain alcohol with an aliphatic polycarboxylic acid having 2 to 10 carbon atoms.

European Published Application 415778 published Mar. 6, 1991 by Kao Corporation discloses refrigeration working fluid composition containing hydrogenated fluoroethane and an ester compound obtained from an aliphatic polyhydric alcohol, a saturated aliphatic dicarboxylic acid and a saturated aliphatic monocarboxylic acid.

European Published Application 406479 published Jan. 9, 1991, by Kyodo Oil Technical Research Center Co., Ltd., discloses lubricants which are said to be compatible with R134a. Suitable lubricants are: esters of neopentyl glycol and a straight or branched-chain monovalent fatty acid having 3–18 carbon atoms; esters of pentaerythritol, dipentaerythritol and tripentaerythritol with straight or branched chain $C_2-C_{18}$ monovalent fatty acids; esters of a trihydroxy polyvalent alcohol of the formula $RC(CH_2OH)_3$ where R is $C_1-C_3$ alkyl with a straight or branched-chain monovalent fatty acid having 2–18 carbon atoms and not more than 25 mol % per total fatty acid of at least one polybasic acid having carbon number of 4–36.

European Published Application 435253 published Jul. 3, 1991 by Nippon Oil Co., Ltd. discloses a number of esters said to be compatible with R134a, the esters being defined as having specific structures and being esters of mono-, di- and tripentaerythritol and other polyols such as trimethylolethane, trimethylolpropane, trimethylolbutane or dimers or trimers thereof with monocarboxylic acids having 2–15 carbon atoms and dicarboxylic acids having 2–10 carbon atoms. The esters are generally said to have molecular weights of about 200–3000.

European Published, Application 430657 published Jun. 5, 1991 by Ashai Denka Kogyo Kabushiki discloses lubricants compatible with R134a which are characterized as being neopentyl polyol ester of a fatty acid having 2 to 6 carbon atoms. It is said in this publication that the use of acids having 7 or more carbon atoms will result in incompatibility if the amount of $C_2-C_6$ acids is not 20 mol % or greater such that the average number of carbon atoms of the fatty acids per hydroxyl group of the neopentylpolyol is 6 or below. Suitable neopentyl polyols include mono-, di- and tripentaerythritol, trimethylolpropane, and trimethylolethane. The polyols must have at least 3 OH groups.

Other references dealing with the problem of R134a lubricant compatibility are U.S. Pat. No. 4,851,144, issued Jul. 25, 1989 to McGraw et al. which discloses mixtures of polyether polyols and esters as lubricants and U.S. Pat. No. 4,755,316, issued Jul. 5, 1988 to Magid et al. which discloses polyether glycols are lubricants for tetrafluoroethane refrigerants.

European Published Application 475751 published Mar. 18, 1992 by Kao Corporation discloses refrigerant working fluids comprising a hydrofluorocarbon and an ester prepared from a neopentyl polyol and a saturated branched $C_7$ to $C_9$ aliphatic monocarboxylic acid and similar esters containing an epoxycyclohexyl or epoxycyclopentyl group.

U.S. Pat. No. 5,096,606, issued Mar. 17, 1992 to Hagihara et al. discloses refrigeration oil compositions comprising a hydrogenated fluoroethane and an ester of an aliphatic polyol having 1 to 6 OH groups and a mixture of straight or branched chain $C_2$ to $C_9$ monocarboxylic acids and $C_2$ to $C_{10}$ straight or branched chain dicarboxylic acids, the ester being formed by reacting the three components together.

European Published Application 480479 published Apr. 15, 1992 by Kyodo Oil Technical Research Center Co., Ltd. discloses refrigeration lubricants based on the ester formed by reacting either mono-, di- or tripentaerythritol with a straight or branched chain monovalent $C_2$ to $C_{18}$ saturated fatty acid.

European Published Application 498152 published Aug. 12, 1992 by CPI Engineering Services, Inc., teaches a lubricant composition for non-chlorine refrigerants prepared from polyols including neopentyl alcohol, trimethylol propane, trimethylol ethane, mono- and dipentaerythritol and branched carboxylic acids having 4 to 18 carbon atoms. The branched acids are preferably those wherein the branching is at a location other than the most distant carbon.

European Published Application 479338, published Apr. 8, 1992 by Kyodo Oil Technical Research Center Co., Ltd. discloses lubricants for chlorine-free hydrofluorocarbon refrigerants which are esters prepared from trimethylol ethane, trimethylol propane or trimethylol butane and at least one straight or branched chain monovalent saturated fatty acid having 2 to 18 carbon atoms.

European Published Application 449406, published Oct. 2, 1991 by Tonen Corporation, teaches a lubricant ester for use with 1,1,1,2-tetrafluoroethane (R134a) which is generally described as an ester having a viscosity at 100° C. of between 2 and 30 mm²/s and preferably the ester is a diester of an aliphatic monohydric alcohol and an aliphatic or aromatic dicarboxylic acid, but various other types of esters are disclosed including esters of polyols with $C_5$ to $C_{12}$ straight or branched chain carboxylic acids.

The prior art summarized above presents a conflicting picture of which lubricants are suitable for use with chlorine-free refrigerants. The present inventors have found that, with respect to polyol esters of alkanoic acids, their suitability for use as compatible lubricants with 1,1,1-trifluoroethane is limited to a very narrowly defined category.

SUMMARY OF THE INVENTION

The present invention is based on the discovery that suitable refrigeration working fluid compositions based on 1,1,1-trifluoroethane may be prepared which comprise about 5–55, preferably 10–35, parts by weight of a synthetic ester and 95–45, preferably 90–65, parts by weight of 1,1,1-trifluoroethane, the synthetic ester being either (a) neopentyl glycol (NPG) esterified with 3,5,5-trimethylhexanoic acid or (b) trimethylolpropane (TMP) esterified with a mixture of acids comprising about 65 wt. % 3,5,5-trimethylhexanoic acid, 22.2 wt. % n-heptanoic acid and 12.8 wt. % methylhexanoic acid. As used herein, the term "methylhexanoic acid" refers to an isomeric mixture of 70 wt. % 2-methylhexanoic acid, 20 wt. % 2-ethylpentanoic acid, 5 wt. % n-heptanoic acid and the balance other heptanoic acid isomers. These working fluid compositions exhibit a desired miscibility value of –20° C. or less (i.e., a temperature lower than –20° C.) over these compositional ranges, i.e., 5–55 parts by weight ester and 95–45 parts by weight trifluoroethane. These esters have suitable lubricating viscosities for use in lubricating refrigeration equipment. The NPG ester has a viscosity of 13.02 cSt at 40° C. and 3.12 cSt at 100° C., the TMP ester has a viscosity of 28.18 cSt at 40° C. and 5.10 cSt at 100° C.

The inventors hereof have evaluated numerous other esters, as tabulated in the example, which were found to be totally incompatible with 1,1,1-trifluoroethane, even though such esters are chemically similar to the two esters described above.

DETAILED DESCRIPTION OF THE INVENTION

As used herein, the term "miscibility value" refers to the highest temperature at which immiscibility occurs over the composition range of 5–55, preferably 10–35 parts by weight of synthetic ester lubricant and 95–45, preferably 90–65 parts by weight of 1,1,1-trifluoroethane (R143a).

Miscibility and immiscibility are determined in the following manner. A measured quantity of ester lubricant is poured into a valved glass tube of 12 mm I.D. The tube is connected to a refrigerant charging unit, where air is evacuated and a set volume of refrigerant is condensed into the glass tube until a desired refrigerant gas pressure drop is obtained. The composition of the lubricant/refrigerant mixture is calculated from weight measurements taken of the tube, tube plus lubricant, and tube plus lubricant plus refrigerant. The tube containing the lubricant/refrigerant is visually observed for miscibility at room temperature, in a high temperature visibility bath where the temperature is thermostatically controlled up to +60° C. (or higher), and in a low temperature visibility bath where the temperature is thermostatically controlled down to –80° C. The mixture is considered miscible to a given temperature if none of the following conditions is observed: cloudiness, formation of floc or precipitate, separation into two liquid layers. The mixture is considered immiscible if any of these conditions is observed.

Esters for use in the invention are prepared by reacting alcohols with acids, preferably a molar excess of acid, using esterification techniques well known in the art at elevated temperatures to form a fully esterified product. Catalysts such as organotin or organotitanium catalysts may be used if desired. The particular method for preparing esters useful in the invention is not critical to the practice of this invention, so long as substantially complete esterification is achieved.

As is well known in the art, the suitable ester lubricants and working fluid compositions of this invention may contain very minor proportions of various special purpose additives, up to about 8% weight cumulatively, such as metal deactivators, antioxidants, corrosion inhibitors, defoaming agents, anti-wear agents, extreme pressure resistant additives, viscosity improvers, and the like.

The invention is further illustrated by the following examples which are not to be considered as limitative of its scope.

EXAMPLE 1

This example reports the miscibility data for the two ester embodiments of this invention in Table 1. "NPG" refers to neopentyl glycol, "TMP" refers to trimethylol propane and "TFE" refers to 1,1,1-trifluoroethane.

TABLE 1

| Acid | Polyol | wt. % Lubricant | wt % TFE | Miscibility Value |
|---|---|---|---|---|
| A. 12.8 wt % methyl- | TMP | 10 | 90 | −50° C. |
| 22.2 wt % n-heptanoic, |  | 25 | 75 | −20° C. |
| 65 wt % 3,5,5-trimethyl-hexanoic |  | 35 | 65 | −20° C. |
| B. 3,5,5-trimethylhexanoic | NPG | 10 | 90 | −80° C. |
|  |  | 25 | 75 | −80° C. |
|  |  | 35 | 65 | −80° C. |

EXAMPLE 2—COMPARATIVE

Reported in Table 2 are numerous esters of polyols and acids which were found to be totally incompatible and immiscible with 1,1,1-trifluoroethane. In the Table TPE refers to technical grade pentaerythritol (85–92 wt. % monopentaerythritol, 7–14 wt. % dipentaerythritol and up to 2 wt. % tripentaerythritol) and "none" means the ester and the TFE were not miscible in the proportions tested over the range −80° C. to +60° C.

TABLE 2

| Acid | Polyol | wt. % Lubricant | wt % TFE | Miscibility Value |
|---|---|---|---|---|
| A. n-C₇, n-C₈, n-C₁₀ mixture | TMP | 10 | 90 | none |
|  |  | 25 | 75 | none |
|  |  | 55 | 65 | none |
| B. 3,5,5-trimethyl-hexanoic | TMP | 10 | 90 | none |
|  |  | 25 | 75 | none |
|  |  | 35 | 65 | none |

TABLE 2-continued

| Acid | Polyol | wt. % Lubricant | wt % TFE | Miscibility Value |
|---|---|---|---|---|
| C. 2-ethylhexanoic | TMP | 10 | 90 | none |
|  |  | 25 | 75 | none |
|  |  | 35 | 65 | none |
| D. Isononanoic | TMP | 10 | 90 | none |
|  |  | 25 | 75 | none |
|  |  | 35 | 65 | none |
| E. Iso-decanoic | TMP | 10 | 90 | none |
|  |  | 25 | 75 | none |
|  |  | 35 | 65 | none |
| F. 2-methylhexanoic | TPE | 10 | 90 | none |
|  |  | 25 | 75 | none |
|  |  | 35 | 65 | none |
| G. 2-ethylhexanoic | TPE | 10 | 90 | none |
|  |  | 25 | 75 | none |
|  |  | 35 | 65 | none |
| H. 15% isooctanoic, 85% 3,5,5-trimethylhexanoic | TPE | 10 | 90 | none |
|  |  | 25 | 75 | none |
|  |  | 35 | 65 | none |
| I. Isononanoic | TPE | 10 | 90 | none |
|  |  | 25 | 75 | none |
|  |  | 35 | 65 | none |
| J. Iso-octanoic | TPE | 10 | 90 | none |
|  |  | 25 | 75 | none |
|  |  | 35 | 65 | none |
| K. 25% isodecanoic, 75% 3,5,5-trimethylhexanoic | TPE | 10 | 90 | none |
|  |  | 25 | 75 | none |
|  |  | 35 | 65 | none |
| L. Isodecanoic | TPE | 10 | 90 | none |
|  |  | 25 | 75 | none |
|  |  | 35 | 65 | none |

What is claimed is:

1. A refrigeration working fluid comprising about 5–55 parts by weight of a synthetic ester lubricant and 95–45 parts by weight of 1,1,1-trifluoroethane refrigerant, the ester being either (a) neopentylglycol esterified with 3,5,5-trimethylhexanoic acid or (b) trimethylol propane esterified with a mixture of about 12.8 wt. % methylhexanoic acid, 22.2 wt. % n-heptanoic acid and 65% 3,5,5-trimethylhexanoic acid, the working fluid having miscibility value of −20° C. or less.

2. The fluid of claim 1 wherein there is present 10–35 parts by weight of said ester and 90–65 parts by weight of said refrigerant.

3. The fluid of claim 1 or 2, wherein the ester is said esterified neopentyl glycol.

4. The fluid of claim 1 or 2 wherein the ester is said esterified trimethylolpropane.

* * * * *